United States Patent [19]

Vickrey

[11] 4,342,620
[45] Aug. 3, 1982

[54] BOX INSERT FOR STORAGE OF SPENT NUCLEAR FUEL ASSEMBLY

[75] Inventor: Richard A. Vickrey, Windsor, Conn.

[73] Assignee: Combustion Engineering, Inc., Windsor, Conn.

[21] Appl. No.: 142,585

[22] Filed: Apr. 21, 1980

[51] Int. Cl.³ .................... G21C 19/20; G21F 5/00
[52] U.S. Cl. ................................ 376/272; 250/507.1
[58] Field of Search .................... 176/30; 250/506, 507

[56] References Cited

U.S. PATENT DOCUMENTS 3,727,059  4/1973  Reese ............................... 250/506
4,177,385  12/1979  Bevilacqua ........................ 250/507

Primary Examiner—Donald P. Walsh
Attorney, Agent, or Firm—L. James Ristas

[57] ABSTRACT

A box insert for receiving nuclear fuel is formed from a plurality of vertically extending plates arranged as an open-ended polygonal container having a smaller cross-sectional area than the opening where the box is to be located in the fuel storage rack. Each plate has a flat portion forming a respective side of the container and an integral tab portion rigidly projecting outwardly from the longitudinal edge of the plate. The adjacent tabs of each plate are connected, thereby giving the container rigidity and providing the container with a plurality of outwardly projecting ribs. When the boxes are located in the rack, the ribs fit into the corners of openings and maintain the container in proper spaced relation relative to the side walls of the opening.

13 Claims, 4 Drawing Figures

BOX INSERT FOR STORAGE OF SPENT NUCLEAR FUEL ASSEMBLY

BACKGROUND OF THE INVENTION

This invention relates to nuclear fuel storage and in particular to an apparatus for storing fuel assemblies in a pool. U.S. Pat. No. 4,177,385 issued on Dec. 4, 1979 to Frank Bevilacqua for "Nuclear Fuel Storage" discloses an apparatus and method for storage of fuel in a stainless steel, egg-crate frame within a storage pool. Fuel is initially stored in a checkerboard pattern or in each opening if the fuel is of low enrichment. Additional fuel (or fuel of higher enrichment) is later stored by adding box inserts within each opening in the frame, thereby forming flux-traps between the openings. Still higher enrichment fuel is later stored by adding poison material around the boxes.

The method and apparatus described in the Bevilacqua patent can be significantly improved by simplifying the structure of the box inserts and the manner in which poison is added thereto.

SUMMARY OF THE INVENTION

It is an object of the invention to provide such a simplified box insert which can be shipped to the reactor plant in a form that is convenient and easy to handle, and which may thereafter be fabricated quickly and inserted into the frame. Another advantage of the invention is that the box inserts may be formed by very thin plates of stainless steel without sacrificing structural rigidity.

In the preferred embodiment the poison material is provided directly on the box inserts. This permits a thinner overall box dimension so that a larger water gap between poison boxes can be maintained in the frame. The increased water gap enhances the flux-trap effect and accordingly provides a less reactive, safer storage facility.

The inventive box insert comprises a plurality of vertically extending plates arranged as a open-ended polygonal container having a smaller cross-sectional area than the opening in the frame. Each plate has a flat portion forming a respective side of the container and an integral tab portion rigidly projecting outwardly from the longitudinal edge of the container. The adjacent tabs of each plate are connected, thereby giving the container rigidity and providing the container with a plurality of outwardly projecting ribs. The box may then be slidingly inserted into the frame so that the ribs fit into the corners of the frame defining the opening. Thereafter a fuel assembly may be lowered into the box portion of the container, which is rigidly maintained in spaced relation from the frame by the ribbed portions of the box.

DESCRIPTION OF THE PREFERRED EMBODIMENT

Figure 1:
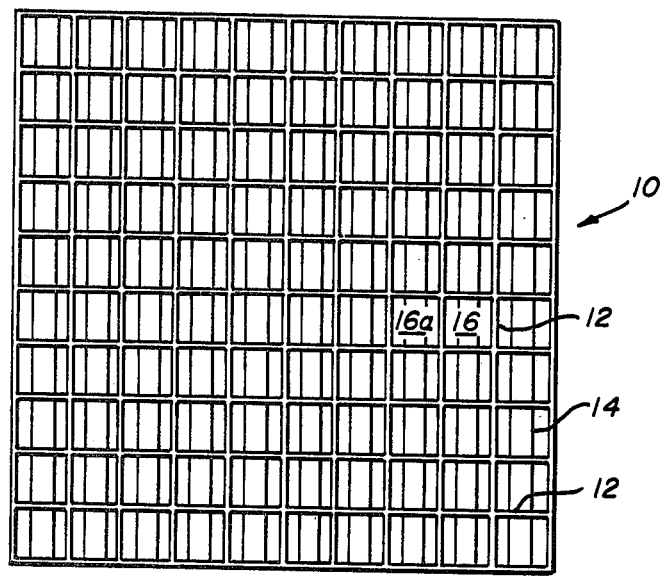
FIG. 1 is a plan view illustrating the general arrangement of a fuel storage rack.
Figure 2:
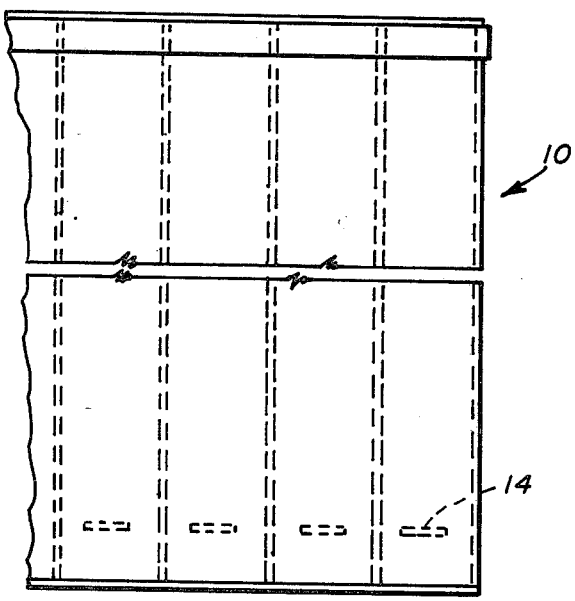
FIG. 2 is a partial side elevation of FIG. 1.

FIGS. 1 and 2 are general arrangement views wherein an egg-crate frame or rack 10 is formed of stainless steel grids or wall members 12. These grids 12 extend through the entire height of the rack and must generally be equal to or greater in length than the active length of the fuel assemblies to be stored. Support bars 14 pass through the lower portion of the rack for support of the fuel assemblies to be stored. The frame 10 thus forms a plurality of vertically extending rectangular openings 16.

Figure 3:
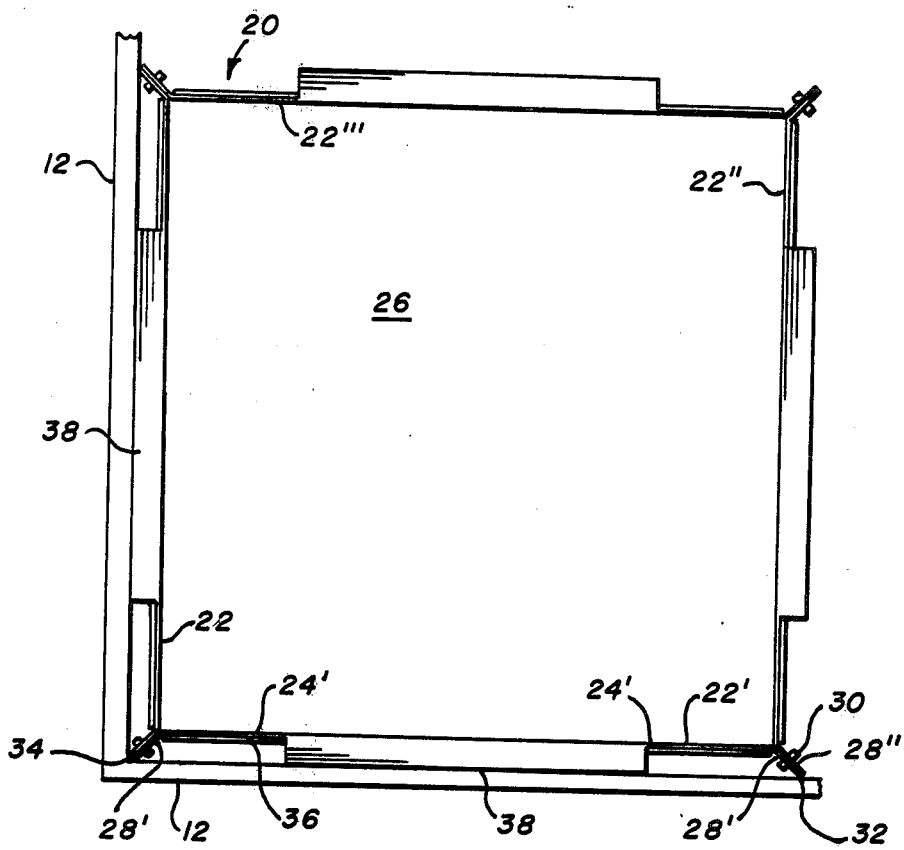
FIG. 3 is a plan view of the box insert, showing a portion of the wall members of the frame.

The maximum storage capacity of the frame 10 is obtained with the use of box inserts. FIG. 3 show the preferred embodiment of the invention wherein the box insert 20 is located within the confines of the opening 16 defined by the frame grids 12 shown in FIG. 1. Each insert 20 is formed by joining together a plurality of metal plates 22 arranged as an oen-ended polygon having the same general shape but smaller area than the opening 16 provided by the frame 10. In the illustrated embodiment, each opening 16 is a square and accordingly the plates 22 form a square.

Figure 4:
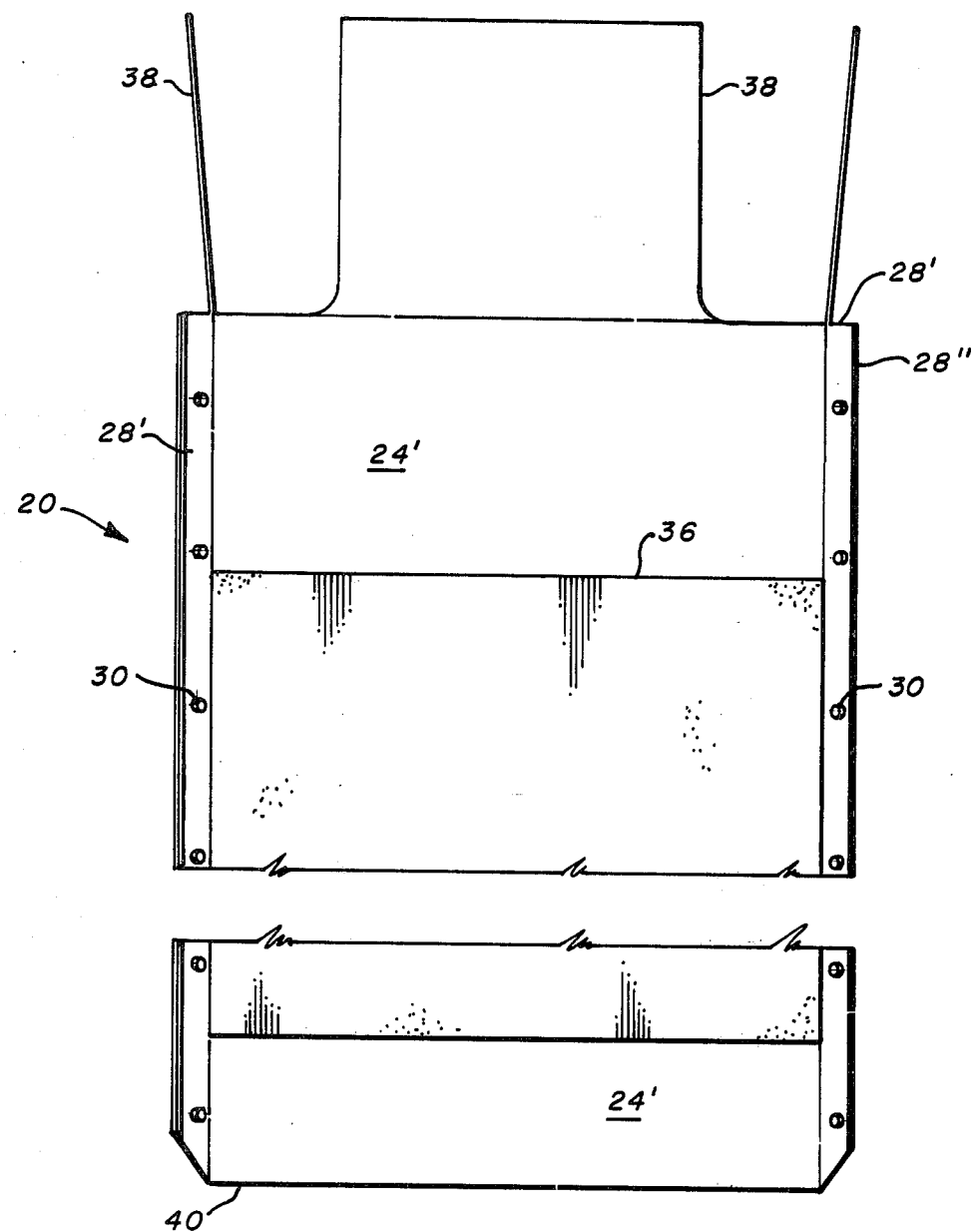
FIG. 4 is an elevation of only the box of FIG. 3.

FIGS. 3 and 4 show one plate 22' which will be described in detail. Each plate 22' has a flat or face portion 24' which forms one of the sides of the container 26, and has integral tab portions 28' rigidly projecting outwardly at an angle to the face portion 24'. Each plate 22' extends in the longitudinal direction at least the length of the fuel assembly to be stored therein (not shown), and each face portion extends laterally at least the distance corresponding to the lateral dimension of the fuel assembly.

It can be readily appreciated that the individual plates 22 are in a very convenient form for shipment to the plant site and for storage at the site. Shortly before the fuel assemblies are to be located in the frame 10 for storage, the box inserts 20 are formed and inserted into the openings 16 in the frame, as shown in FIGS. 1 and 3.

In the preferred embodiment, the plate 22' is oriented at right angle to another plate 22" whereby the tabs 28', 28" mate with each other over substantially the entire length of the plates 22', 22". The tabs are then joined together, for example, by spot welding or bolts 30 at spaced intervals over the length of the plates. Another plate 22''' is then brought at right angles to plate 22" and their respective tabs are also connected, and the fourth plate is then connected in turn to the third and first plates. Thus the box insert 20 is formed having a rigid container portion 26 and having a plurality of outwardly projecting ribs 32.

In the preferred embodiment each plate 22 is made from type 304 stainless steel and has a thickness in the range of about 0.050–0.065 inch (0.125–0.165 cm). The present invention permits the use of relatively thinner stainless steel that is generally permissible with other fuel storage rack inserts because of the rigidity provided by the ribs 32, as described below.

The box insert 20 is placed within the opening 16. The ribs 32 fit into the corners 34 of the openings formed by the wall members 12 of the frame. The ribs thus provide two important functions. First they provide rigidity to the container portion 26 of the box 20. Any lateral loads transmitted from the frame to the container plates 22 are primarily transmitted as a compressive force along the lateral dimension of the plates. This permits the use of thinner plate material than is generally used. Secondly, the ribs 32 keep the container 26 in a well-maintained, spaced relationship from the grids 12. This insures that, within close uncertainties and tolerances, the fuel assembly to be located within the container portion 26 will have a minimum separation from the fuel assembly to be located in the closest box insert in the adjacent opening 16a in the frame (see FIG. 1).

The assurance of a minimum separation permits the user of the invention to take full advantage of the flux-trap affect which is known to those skilled in the art as a way of avoiding excessive neutronic coupling of adjacent fuel assemblies in a moderating medium such a fuel storage pool.

In the preferred embodiment of the invention, the neutronic coupling of adjacent assemblies can be further reduced by providing a layer of neutron absorbing poison material 36 on the outer side of the face portion 24' of the plate 22". The layer could be a coating of $B_4C$ that is bonded directly to the plate before shipment, as by a spraying technique available from the Carborandum Company, Niagara Falls, N.Y. In another form, the layer could be a sheet of $B_4C$ in a matrix of ethylene propylene diene rubber, as is available, for example, from the Raybestos Manhattan Industrial Products Company, or a polymeric silicone encapsulant fixing fine particles of $B_4C$ as is available from Brand Industrial Services, Inc., Park Ridge, Ill. With the sheet form, a thin foil of stainless steel (not shown) may be rivited over the sheet to hold it in place against the plate surface 24'. The maximum thickness of the poison layer 36, including foil cover where needed, will generally be in the range of 0.040–0.090 inch (0.100–0.230 cm).

As a further aid in locating the fuel assemblies within the container portion 26 of the box insert 20, the plates may have formed on their upper ends a flared member 38 which acts as a guide for the lower portion of the fuel assembly as it is lowered into the box insert. The lower ends 40 of the plates 22 are not required to have any special structure since the ends merely rest on the support bars 14 as shown in FIG. 1.

It may be appreciated that the present invention provides a simple way of constructing a box insert for placement in a frame of a nuclear fuel storage facility. Although the preferred embodiment shows a square box insert formed by connecting four plates each having tabs extending at a 45 degree angle from the faces of the plates, the ordinary practitioner in this field could easily adapt the design to provide box inserts for polygonal fuel assemblies and frame openings.

I claim:

1. A box to be inserted into a stationary nuclear fuel storage pool frame having a multiplicity of vertically extending polygonal openings, the box adapted for receiving a nuclear fuel assembly, comprising:
    a plurality of vertically extending metal plates arranged as an open ended polygonal container having a smaller cross-sectional area than the opening in the frame;
    each plate having a flat portion forming the respective sides of the container and having an integral tab portion rigidly projecting outwardly from at least one longitudinal edge of the plate;
    connecting means joining each tab to a tab of an adjacent plate to form a rigid container having a plurality of outwardly projecting ribs;
    whereby the box may be slidingly inserted into the frame so that the ribs fit into the corners of the frame defining the opening.

2. The box insert of claim 1 wherein each plate has two tab portions extending over substantially the entire longitudinal length of the plate.

3. The box insert of claim 2 wherein the container is a square and each tab is angled at about 45 degrees to the flat portion of the plate.

4. The box insert of claims 2 or 3 wherein the adjacent tabs are connected at spaced intervals along their longitudinal dimension.

5. The box insert of claim 3 wherein each plate is made of stainless steel having a thickness in the range of about 0.050–0.065 inch.

6. The box insert of claims 3 or 5 wherein the flat portion of at least some plates has a layer of neutron absorbing poison material attached thereto.

7. The box insert of claim 6 wherein the thickness of the layer of poison material is less than about 0.090 inch.

8. In a rack for storing nuclear fuel in a pool area of a stationary facility including a frame having a plurality of perpendicular wall members defining a plurality of square openings and box inserts located within the openings for receiving assemblies to be stored, the improvement which comprises each box insert having a square, flat sided container portion for receiving the fuel assembly and having external ribs at the corners of the container portion, the ribs fitting slidingly into the inside corners of the openings whereby the container is maintained in predetermined, spaced relation from each wall defining the opening.

9. The improvement of claim 8 wherein the container is formed from four metal plates each having two tabs projecting at an angle from the flat surfaces thereof, the tabs of adjacent plates being connected to form the ribs.

10. The improvement of claim 9 wherein each tab is integral with and runs over substantially the entire longitudinal length of its respective plate.

11. The improvement of claim 10 wherein the plates are made of stainless steel having a thickness in the range of about 0.050–0.065 inches.

12. The improvement of claims 9 or 11 wherein the flat portion of at least some plates has a layer of neutron absorbing poison material attached thereto.

13. The improvement of claim 12 wherein the thickness of the layer of poison material is less than about 0.090 inch.

* * * * *